United States Patent [19]

Nakai et al.

[11] Patent Number: 5,494,443
[45] Date of Patent: Feb. 27, 1996

[54] KARAOKE SYSTEM AND METHOD OF MANAGING PLAYING TIME OF KARAOKE SONGS

[75] Inventors: Toshiki Nakai; Mitsuyoshi Amano; Kazuhiro Miyamoto; Yoshiyuki Akiba; Masuhiro Sato, all of Tokyo, Japan

[73] Assignee: Pioneer Electronic Corporation, Tokyo, Japan

[21] Appl. No.: 286,541

[22] Filed: Aug. 5, 1994

[30]  Foreign Application Priority Data

Aug. 10, 1993  [JP]  Japan .................................. 5-198097

[51] Int. Cl.⁶ ..................................................... G10H 1/36
[52] U.S. Cl. ........................ 434/307 A; 434/308; 84/609
[58] Field of Search ............................. 434/307 R, 307 a, 434/308, 309, 318, 365; 84/477 R, 601, 603, 609, 610, 625, 630, 631, 634, 645; 369/2, 48, 178, 182; 360/32, 33.01, 49, 70, 77.01; 358/335; 381/51; 395/2.79, 154, 160; 345/141, 143, 147; 348/478, 488, 571

[56]  References Cited

U.S. PATENT DOCUMENTS

| | | | |
|---|---|---|---|
| 5,131,311 | 7/1992 | Murakami et al. | 434/307 a |
| 5,247,127 | 9/1993 | Tsumura | 434/307 A |
| 5,355,762 | 10/1994 | Tabata | 84/609 |
| 5,365,576 | 11/1994 | Tsumura et al. | 348/16 X |
| 5,397,853 | 3/1995 | Koguchi | 434/307 A |

*Primary Examiner*—Joe H. Cheng
*Attorney, Agent, or Firm*—Kane, Dalsimer, Sullivan, Kurucz, Levy, Eisele and Richard

[57]  ABSTRACT

A karaoke system includes: reproduction unit for reproducing a MIDI sound source control information for karaoke song from a karaoke data recording medium, the MIDI sound source control information including playing time data of the karaoke songs; operation unit for inputting request of at least one desired karaoke song and karaoke playing time; calculation unit for obtaining playing time data of the requested karaoke songs and for calculating total playing time required for playing all of the requested karaoke songs; determination unit for comparing the total playing time with remaining playing time calculated on the basis of the karaoke playing time and for determining whether all of the requested songs can be played within the remaining playing time or not; and display unit for displaying a notice related to the result of the determination of the determination unit.

9 Claims, 6 Drawing Sheets

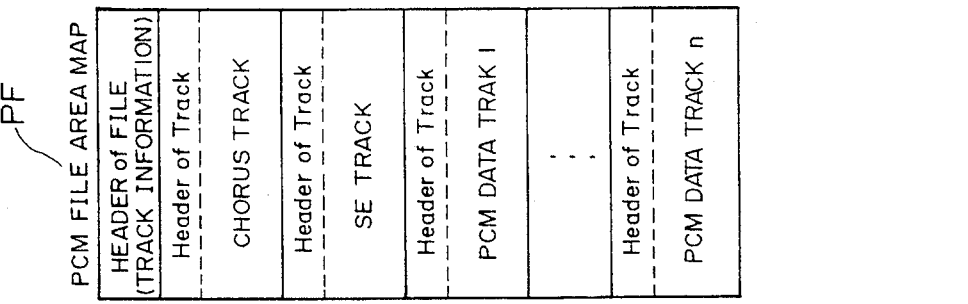
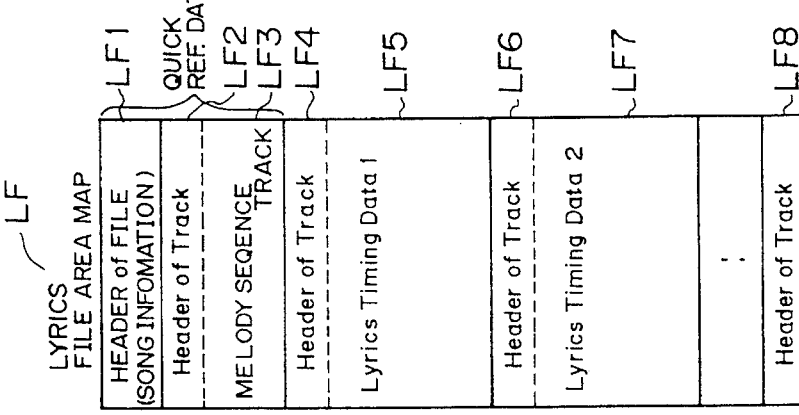
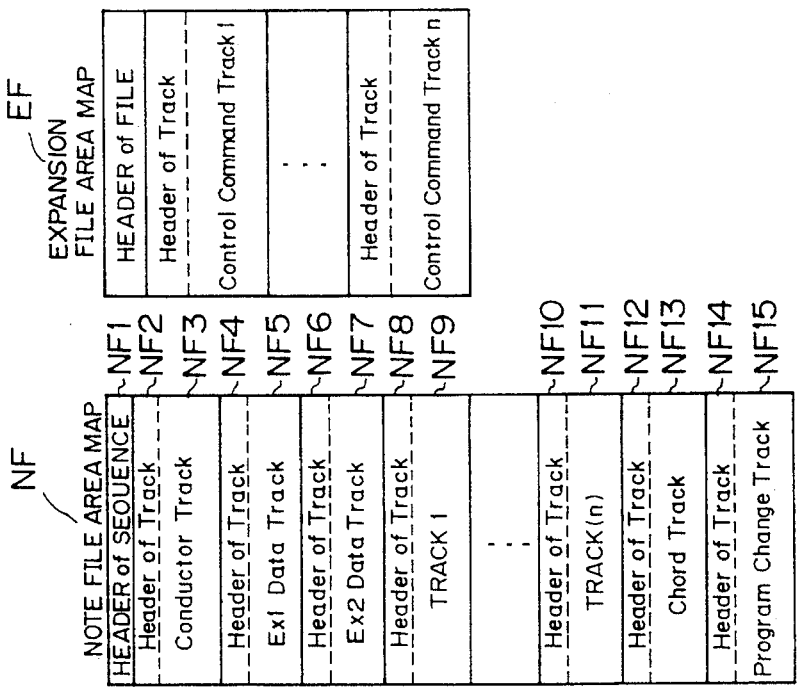

FIG. 4

| BYTE | DATA |
|---|---|
| 1 | Status Byte |
| 2 ~ 5 | Header Length |
| 6 | Status Byte |
| 7 | Song Information (system use) |
| 8 | Status Byte |
| 9 ~ m | Song's name |
| m+1 | Status Byte |
| m+2 ~ n | Reading of Song's name |
| n+1 | Status Byte |
| n+2 ~ p | Singer's name |
| p+1 | Status Byte |
| p+2 ~ q | Reading of Singer's name |
| q+1 | Status Byte |
| q+2 ~ q+4 | Genre 1.2.3 |
| q+5 | Status Byte |
| q+6 ~ r | Songwriter |
| r+1 | Status Byte |
| r+2 ~ s | Composer |
| s+1 | Status Byte |
| s+2 ~ t | Translator |
| t+1 | Status Byte |
| t+2 ~ u | Arranger |
| u+1 | Status Byte |
| u+2 ~ u+3 | Produce's Year |
| u+4 | Status Byte |
| u+5 ~ v | Intro of Lyrics |
| v+1 | Status Byte |
| v+2 ~ w | Reading of Lyrics |
| w+1 | Status Byte |
| w+2 ~ w+7 | Keyword 1.2.3 |
| w+8 | Status Byte |
| w+9 ~ w+10 | Background Pattern |
| w+11 | Status Byte |
| w+12 ~ w+13 | Total Time (Standard Playing) |
| w+14 | Status Byte |
| w+15 ~ w+16 | Total Time (2 Chorus Playing) |
| w+17 | Status Byte |
| w+18 ~ w+19 | Total Time (Omnibus Playing1) |
| w+20 | Status Byte |
| w+21 ~ w+22 | Total Time (Omnibus Playing2) |
| w+23 | Status Byte |
| w+24 ~ w+25 | Total Time (Omnibus Playing3) |
| w+26 | Status Byte |
| w+27 | Number of Lyrics Track |
| w+28 ~ x | Language Code |
| x+1 ~ x+2 | Header End Data |

KARAOKE SYSTEM AND METHOD OF MANAGING PLAYING TIME OF KARAOKE SONGS

BACKGROUND OF THE INVENTION

1. Field of the Invention

This invention relates to so-called karaoke system, and more particularly to karaoke system capable of managing playing time of karaoke songs utilizing data recorded according to MIDI (Musical Instrument Digital Interface) standard.

2. Description of the Prior Art

Conventionally, there are known karaoke systems constructed as illustrated in FIGS. 1 and 2. FIG. 1 illustrates construction of system called "LVD karaoke system". This LVD karaoke system $K_1$ includes an LVD auto-changer $PL_1$, a commander $CM_1$, an operation unit $CB_1$, an amplifier $AM_1$, speakers $SP_1$ and $SP_2$, an image display device $GD_1$ and a microphone $MC_1$. The LVD auto-changer $PL_1$ reproduces information from a plurality of laser video disks $D_1$, serving as karaoke information recording media, housed therein. The commander $CM_1$ controls the LVD auto-changer $PL_1$ to select a laser video disk $D_1$ in the LVD auto-changer $PL_1$ in response to request of songs input via the operation unit $CB_1$. The image display unit $GD_1$ displays image of reproduced image signal. The microphone $MC_1$ converts singing voice into an audio signal and outputs it to the amplifier $AM_1$. The amplifier $AM_1$ mixes audio signal, serving as karaoke signal, from the LVD auto-changer $PL_1$ with the audio signal of singing voice supplied from the microphone $MC_1$, and outputs the mixed audio signal to the speakers $SP_1$ and $SP_2$. The speakers $SP_1$ and $SP_2$ output the mixed audio signal as acoustic sound. The commander $CM_1$ may includes the operation unit $CB_1$ in it.

FIG. 2 illustrates construction of system called "CD karaoke system". This CD karaoke system $K_2$ includes a CD auto-changer $PL_2$, a commander $CM_2$, an operation unit $CB_2$, an amplifier $AM_2$, speakers $SP_3$ and $SP_4$, a graphic decoder DE, an image display device $GD_2$ and a microphone $MC_2$. The CD auto-changer $PL_2$ reproduces information from a plurality of compact disks $D_2$, serving as karaoke information recording media, housed therein. The commander $CM_2$ controls the CD auto-changer $PL_2$ to select a compact disk $D_2$ in the CD auto-changer $PL_2$ in response to a request of songs input via the operation unit $CB_2$. The graphic decoder DE converts graphic data obtained from subcode data in the compact disk $D_2$ into image signal, and the image display unit $GD_2$ displays image of the image signal. The microphone $MC_2$ converts singing voice into an audio signal and outputs it to the amplifier $AM_2$. The amplifier $AM_2$ mixes audio signal, serving as karaoke signal, from the CD auto-changer $PL_2$ with the audio signal of singing voice supplied from the microphone $MC_2$, and outputs the mixed audio signal to the speakers $SP_3$ and $SP_4$. The speakers $SP_3$ and $SP_4$ output the mixed audio signal as acoustic sound. The commander $CM_2$ may includes the operation unit $CB_2$ and the graphic decoder DE in it. Using the systems described above, user can sing a song with accompaniment of karaoke music and enjoy images displayed simultaneously. The above-described karaoke system obtains playing time data of songs from data recorded in laser video disk $D_1$ or compact disk $D_2$, and simply displays playing time of each songs and total playing time.

Recently there is a business known as "Karaoke Box" or "Karaoke Room". In such a business, user rents a room in which karaoke system is installed, enjoys singing karaoke songs, and pays for use of the room by the hour. User decides playing time of karaoke system (i.e., how long user enjoys karaoke in the room) in advance and clerks of the karaoke room notifies ending of the time to the user. However, in use of the above-described karaoke system, user sometimes makes reservation of karaoke songs without considering how long the playing time remains. Therefore, user is difficult to know how many songs he can sing within the remaining playing time. Sometimes, all reserved songs cannot played within the remaining playing time and user leaves the karaoke room with some reserved songs remained unsung. This is not preferable in view of management of karaoke box and service to users.

SUMMARY OF THE INVENTION

It is an object of the present invention to provide a karaoke system with which user can comfortably enjoy karaoke play until the end of the playing time in karaoke box.

According to one aspect of the present invention, there is provided a karaoke system including: reproduction unit for reproducing a MIDI sound source control information for karaoke song from a karaoke data recording medium, the MIDI sound source control information including playing time data of the karaoke songs; operation unit for inputting request of at least one desired karaoke song and karaoke playing time; calculation unit for obtaining playing time data of the requested karaoke songs and for calculating total playing time required for playing all of the requested karaoke songs; determination unit for comparing the total playing time with remaining playing time calculated on the basis of the karaoke playing time and for determining whether all of the requested songs can be played within the remaining playing time or not; and display unit for displaying a notice related to the result of the determination of the determination unit.

According to another aspect of the present invention, there is provided a method of managing playing time of karaoke songs including the steps of: inputting karaoke playing time in which karaoke system is played; inputting at least one request of desired karaoke song; calculating remaining playing time from present time and the karaoke playing time; reproducing playing time data for the requested karaoke songs from a karaoke data recording medium and calculating total playing time of all of the requested karaoke songs; comparing the remaining playing time with the total playing time to determine whether all of the requested karaoke songs can be played within the remaining playing time or not; and displaying a notice related to the result of the determination to notify it to the user.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A–3D are diagrams illustrating contents of MIDI karaoke file;

FIG. 4 illustrates an example of file header in lyrics file;

DESCRIPTION OF THE PREFERRED EMBODIMENT

Figure 1:
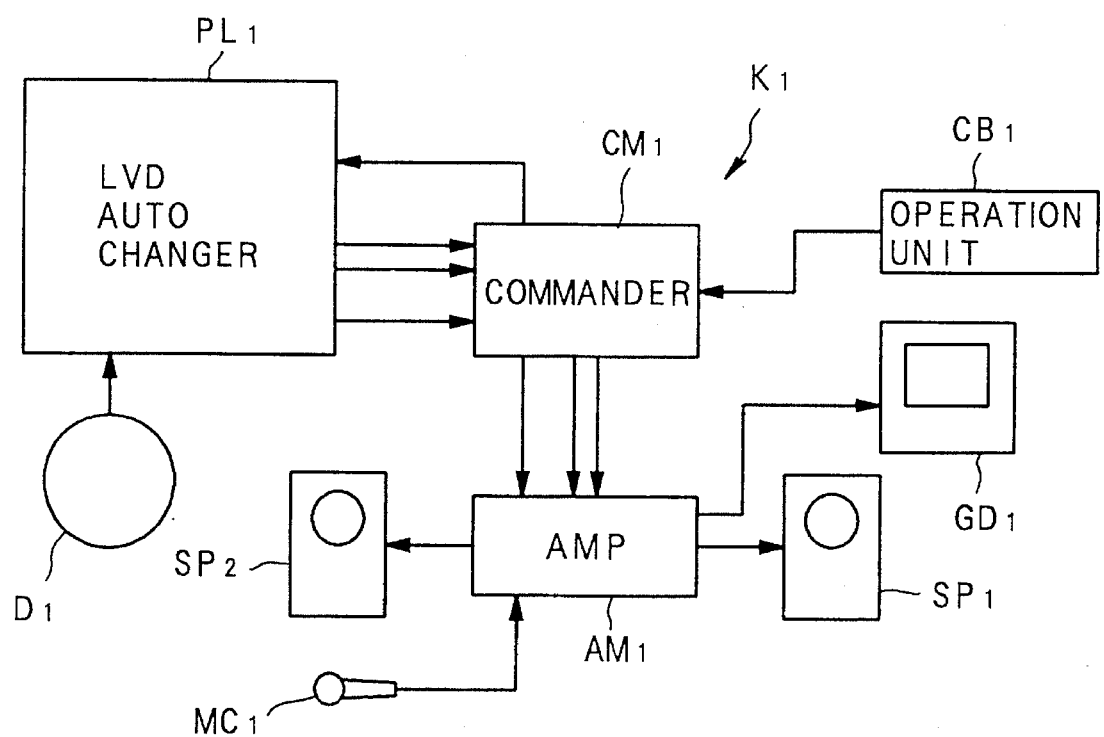
FIG. 1 is a block diagram illustrating construction of so-called LVD karaoke system.
Figure 2:
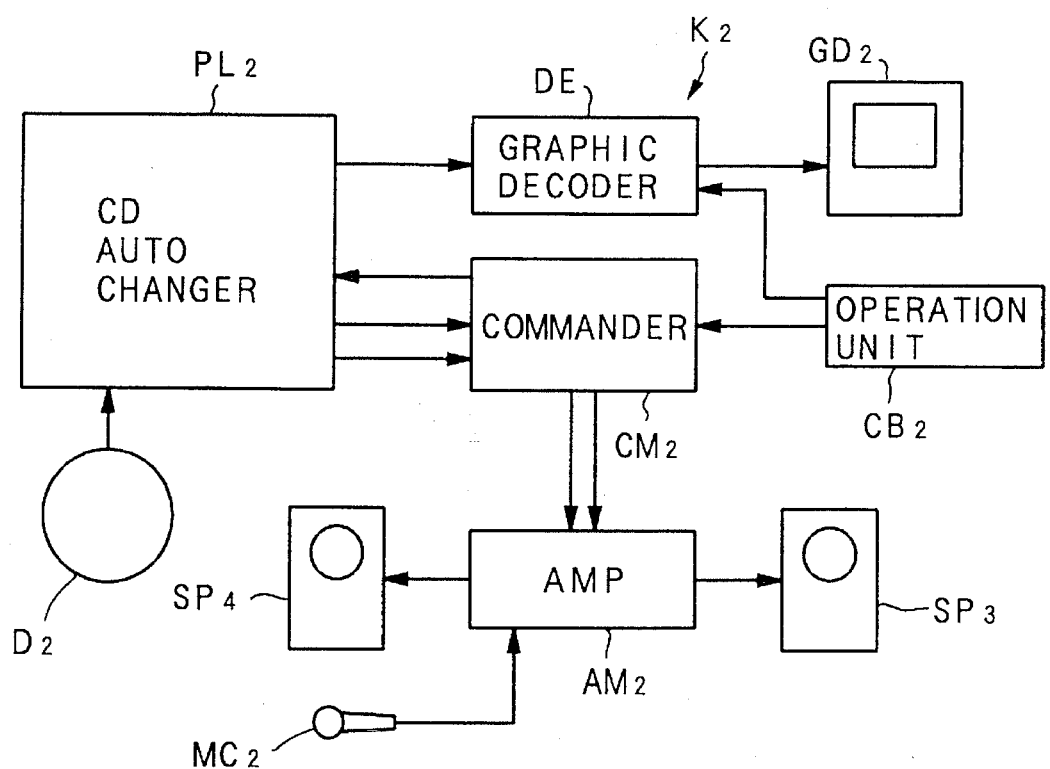
FIG. 2 is a block diagram illustrating construction of so-called CD karaoke system.

Prior to description of a preferred embodiment of the present invention, details of MIDI standard, MIDI sound source and karaoke information recording medium according to MIDI standard will be described with reference to FIGS. 3A–3D and 4.

MIDI standard and MIDI sound source:

MIDI (Musical Instrument Digital Interface) is a standard established for exchanging music play information between musical instruments such as synthesizer or electronic piano connected with each other. Electronic instruments incorporating hardware according to MIDI standard and having functions of transmitting and receiving MIDI signal, serving as musical instruments control signal for defining various musical information according to MIDI standard, are generally called as "MIDI equipments".

On disks such as Compact Disk (CD), Compact Disk Video (CD-V) or laser Video Disk (LVD) including digital audio signal of CD-format and Digital Audio Tape (DAT), subcode is recorded in addition to main data. Subcode is comprised of 8 bits data of P, Q, R, S, T, U, V and W channels, and P and Q channels are used for control of disk player and display. R–W channels are empty (blank) channels called as "user's bit". Various applications of the user's bit to graphic, audio or visual fields have been discussed, and a standard for graphic format have been already proposed. In addition, it is possible to record MIDI format signal in user's bit, and a standard thereof has been proposed. According to this application, it is possible to supply audio/video signal reproduced by disk player to AV system so that user can view a program recorded on a disk player. Further, it is also possible to supply play program recorded on disk to MIDI equipments. In this view, it has been proposed many applications of such recording media to AV system with MIDI equipments which gives user feeling of concert hall presence or studio presence, or applications to production of educational software.

MIDI equipment plays music according to instrument play program of MIDI signal which is obtained by converting MIDI format signal obtained from disk player into serial signal. MIDI signal is serial data of transfer rate 31.25 [Kbaud (=1000 bps)]. One byte data of MIDI signal consists of 10 bits data including 8 bits for data, 1 bit for start bit and 1 bit for stop bit. Status byte indicating kinds of transferred data and MIDI channels, and one or more data bytes introduced by the status are used in combination to form a message serving as musical information. Accordingly, one message generally consists of 1 to 3 bytes, and transfer time of one message ranges from 320 to 960 [μsec]. These successive messages constitute instrument play program.

MIDI karaoke information recording medium:

Next, an example of information recording medium according to MIDI standard will be described with reference to FIGS. 3A–3D and 4. FIGS. 3A–3D illustrate data format of MIDI karaoke file stored in Optical Memory Disk (OMD) serving as karaoke information recording medium. OMD is recordable optical disk used as memory. As illustrated, MIDI karaoke file format includes note file NF which is area for storing MIDI sound source control information, expansion file EF which is area for storing equipment control information, lyrics file LF which is area for storing lyrics (words-of-song) information and PCM file PF which is area for recording supplemental accompaniment information. The lyrics file LF includes quick reference data serving as retrieval information. The lyrics file LF, the PCM file PF and the expansion file EF constitute karaoke-related information recording area. The note file NF stores actual play data, and includes data areas $NF_1$–$NF_{15}$. The lyrics file LF stores data of lyrics telop displayed on a monitor TV, and includes data areas $LF_1$–$LF_9$. The data areas $LF_1$–$LF_3$ also includes quick reference data.

FIG. 4 illustrates an example of file-header $LF_1$ in the lyrics file LF. In this area, total playing time data of standard playing mode is recorded in the areas of (W+12)th–(W+13)th bytes, and total playing time of short playing mode (2 chorus playing) is recorded in the areas of (W+15)th–(W+16)th bytes. Playing time of omnibus playing mode is recorded in the areas of (W+18)th–(W+19)th bytes.

Figure 5:
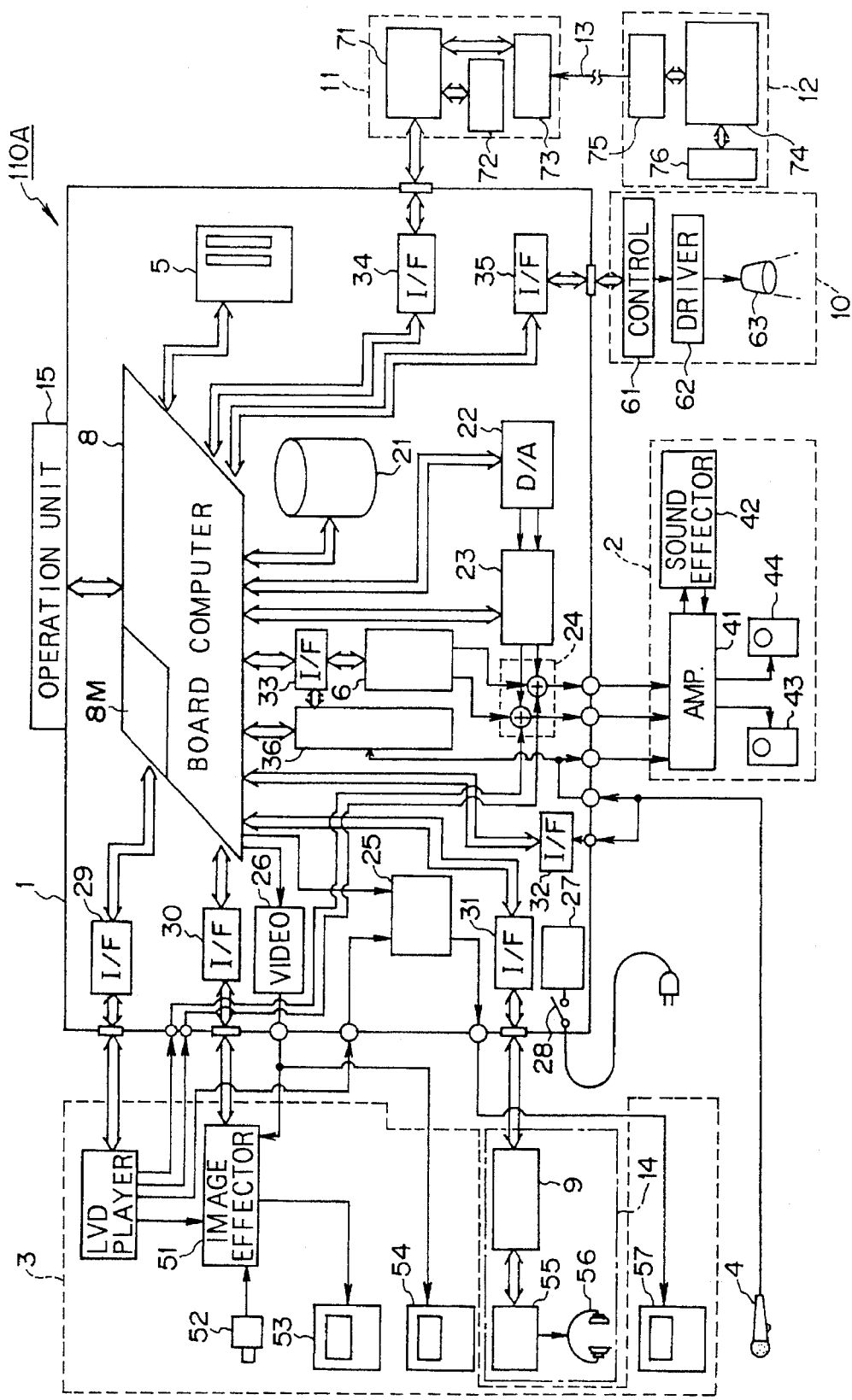
FIG. 5 is a block diagram illustrating a construction of MIDI karaoke system according to the present invention.

Karaoke system:

Next, MIDI karaoke system according to the present invention will be described below with reference to the accompanying drawings. As illustrated in FIG. 5, MIDI karaoke system 110A roughly includes a MIDI control device 1, a sound output system 2, an image display system 3, a microphone 4, a lighting system 10 and a quick reference system 14. Additionally, a data transmission system 11 and a data transmission system 12 connected to the data transmission system 11 via telephone line 13 may be provided.

The MIDI control device 1 includes an Optical Memory Disk Drive (OMDD) 5 for recording and/or reproducing karaoke information, a MIDI sound source module 6, a board computer 8, an operation unit 15, a storage unit 21 which may be a hard disk for storing control program of the board computer 8, a D/A converter 22, a key-controller 23, a mixer 24, a superimposition circuit 25, a video processing circuit 26, a power supply 27, a power supply switch 28, interfaces 29–35 and a volume control block 36. The sound output system 2 includes an amplifier 41, a sound effector 42, speakers 43 and 44. The image display system 3 includes a LVD player 7, an image effector 51, a video camera 52, a user display 53, a reservation display 54 and a singer display 57. The quick reference system 14 includes a user terminal 9, a MIDI sound source module 55 and a headphone 56. The lighting system 10 includes a lighting controller 61, a driver 62 and a lighting device 63. The data transmission system 11 includes a microcomputer 71, a storage unit 72 and a modem 73. The data transmission system 12 includes a central computer 74, a modem 75 and a storage unit 76.

Figure 6:
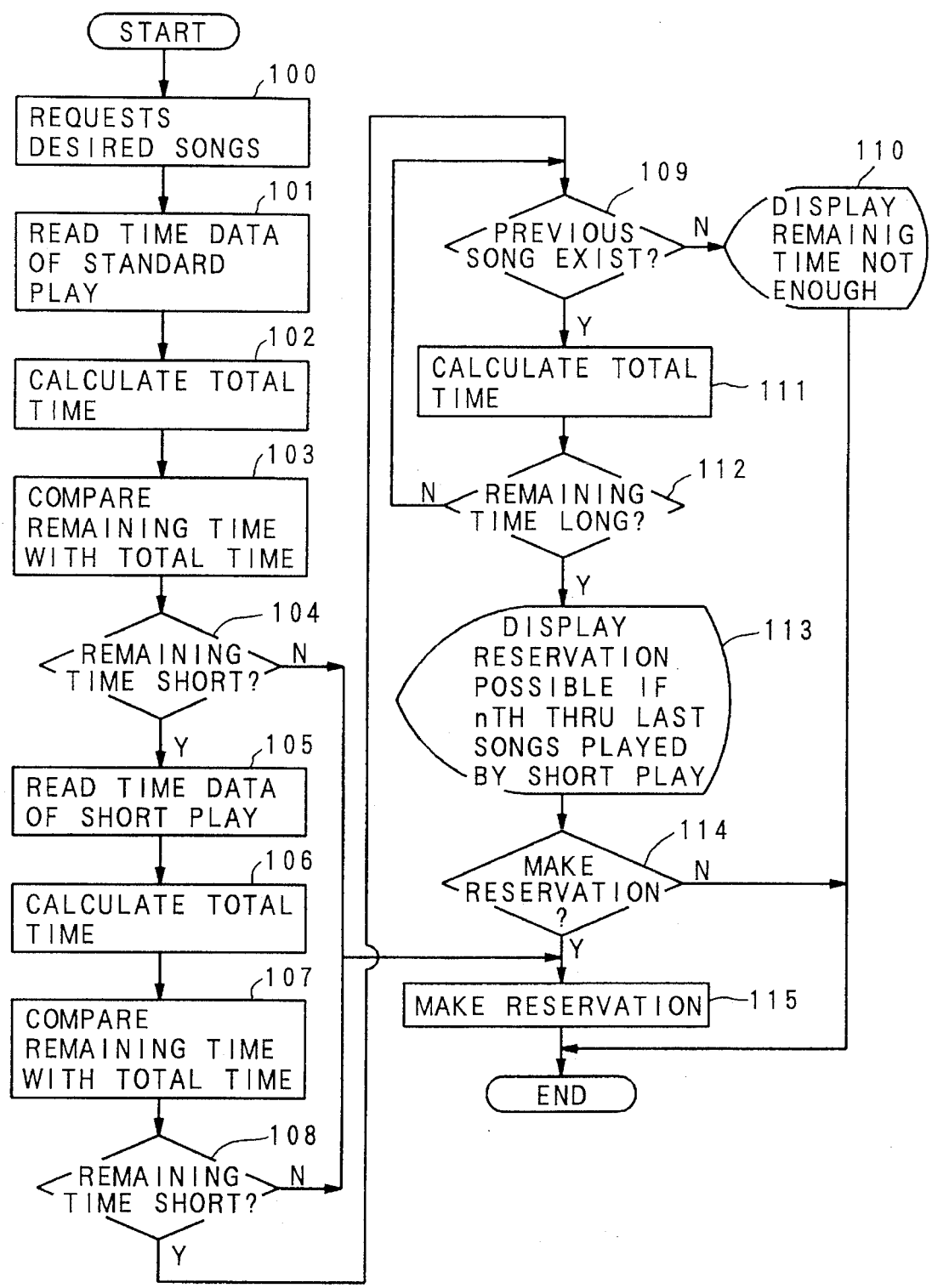
FIG. 6 is a flowchart illustrating operation of playing time management by MIDI karaoke system according to the present invention.

Next, time management operation of MIDI karaoke system according to the present invention will be described with reference to FIG. 6. Quick reference data IF, which is a part of MIDI karaoke data, is supplied to RAM 8M in the board computer 8 at starting time of the system. Then, user retrieves quick reference data IF and requests desired songs using the operation unit 15 (Step 100). It is noted that ending time of using karaoke room has been input to the board computer 8 in advance. Then, in response to the request, the board computer 8 reads out data of the requested songs (i.e., note file NF, lyrics file LF and PCM file PF) from the OMDD 5, and stores it in the RAM 8M. Subsequently, the board computer 8 reads out playing time data of standard playing mode for the requested songs from the portions of (W+12)th–(W+13)th bytes of the file header portion $LF_1$ in lyrics file LF stored in the RAM 8M (Step 101), and calculates total playing time required for playing all requested songs (Step 102). Then, the board computer 8 compares remaining playing time (time length from the present time until the ending time of using the karaoke box) with the calculated total playing time (Step 103), and determines whether the remaining time is shorter than the total playing time or not (Step 104). If the remaining time is longer than the total playing time (Step 104:NO), user actually makes reservation of the requested songs using the operation unit 15 (Step 115) and then the process ends. On the other hand, if the remaining playing time is shorter than the total playing time (Step 104:YES), the board computer 8 reads out playing time data of short playing mode for the requested songs from the portions of (W+15)th–(W+16)th bytes of the file header portion $LF_1$ in lyrics file LF stored in the RAM 8M (Step 105). Then, the board computer calculates total playing time of the requested songs for a case where last song of the requested songs is played by the short playing mode and the other requested songs are played by the standard playing mode (Step 106). Then, the board computer 8 compares the remaining playing time with the total playing time newly calculated (Step 107), and determines whether the remaining time is shorter than the total playing time or not (Step 108). If the remaining time is longer than the total playing time (Step 108:NO), user actually makes reservation of the requested songs using the operation unit 15 (Step 115) and then the process ends.

On the other hand, if the remaining time is still shorter than the total playing time (Step 108:YES), the board computer determines whether there exists a song previous (requested prior) to the last song (Step 109). If there exists no requested song previous to the last song (Step 109:NO), the display 54 displays a notice that "REMAINING TIME IS NOT ENOUGH" (Step 110) and the process ends. If there exist requested song previous to the last song (Step 109:YES), the board computer 8 newly calculates total playing time for a case where the song requested just before the last song is also played by the short playing mode (Step 111). Subsequently, the board computer 8 compares the remaining time with the total playing time newly calculated and determines whether the remaining time is longer than the total playing time or not (Step 112). If the remaining time is still shorter (Step 112:NO), Steps 109, 111 and 112 are repeated. Namely, the board computer 8 calculates total playing time for a case where last three requested songs are played by the short playing mode and the other requested songs are played by the standard playing mode, and compares the total playing time newly calculated with the remaining time. On the other hand, if the remaining time is longer than the total playing time (Step 112:YES), the display 54 displays a notice that "ALL SONGS CAN BE RESERVED IF nTH THRU LAST SONGS ARE PLAYED BY SHORT PLAYING MODE" (Step 113). Then, the board computer 8 asks user whether he wishes to reserve the requested songs in that manner or not (Step 114). If user wishes to reserve the songs (Step 114:YES), he instructs reservation of the requested songs in that manner via the operation unit 15 (Step 115), and the process ends. On the other hand, if user does not wish to reserve the songs in that manner (Step 114:NO), the process ends without making reservation.

As described above, according to the present invention, the system extracts playing time of requested songs, calculates total playing time of the songs and compares it with the remaining time to determine whether all requested songs can be played within the remaining time or not. Therefore, karaoke play of all requested songs are completed before the ending time of using the karaoke room. Clerks of the karaoke room does not have to notify ending time of the karaoke room to user. Further, since playing time data of short playing mode is also prepared and recorded, user can reserve and sing many karaoke songs utilizing short play mode.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A karaoke system comprising:

reproduction unit for reproducing a MIDI sound source control information for karaoke song from a karaoke data recording medium, the MIDI sound source control information including playing time data of the karaoke songs;

operation unit for inputting request of at least one desired karaoke song and karaoke playing time;

calculation unit for obtaining playing time data of the requested karaoke songs and for calculating total playing time required for playing all of the requested karaoke songs;

determination unit for comparing the total playing time with remaining playing time calculated on the basis of the karaoke playing time and for determining whether all of the requested songs can be played within the remaining playing time or not; and display unit for displaying a notice related to the result of the determination of the determination unit.

2. A karaoke system according to claim 1, wherein said calculation unit calculates the remaining playing time from the karaoke playing time input by the operation unit and present time.

3. A karaoke system according to claim 1, wherein said playing time data comprises standard playing time data and short playing time data, and said calculation unit calculates the total playing time in such a manner that playing time of some of the requested karaoke songs is calculated on the basis of the short playing time data and playing time of other requested karaoke songs is calculated on the basis of the standard playing time data.

4. A karaoke system according to claim 1, wherein said playing time data comprises standard playing time data and short playing time data, and said calculation unit again calculates the playing time of at least one of the requested karaoke songs on the basis of the short playing time data when the determination result is such that all of the requested songs cannot be played within the remaining playing time.

5. A karaoke system according to claim 1, further comprising storage unit for storing the karaoke playing time input by the operation unit.

6. A method of managing playing time of karaoke songs comprising the steps of:

inputting karaoke playing time in which karaoke system is played;

inputting at least one request of desired karaoke song;

calculating remaining playing time from present time and the karaoke playing time;

reproducing playing time data for the requested karaoke songs from a karaoke data recording medium and calculating total playing time of all of the requested karaoke songs;

comparing the remaining playing time with the total playing time to determine whether all of the requested karaoke songs can be played within the remaining playing time or not; and displaying a notice related to the result of the determination to notify it to the user.

7. A method according to claim 6, further comprising the step of newly calculating the total playing time of the requested karaoke songs in such a manner that playing time of some of the requested karaoke songs is calculated on the basis of short playing time data and playing time of other requested karaoke songs is calculated on the basis of standard playing time data.

8. A method of managing playing time of karaoke songs comprising the steps of:

(a) inputting karaoke playing time in which karaoke system is played;

(b) inputting at least one request of desired karaoke song;

(c) calculating remaining playing time from present time and the karaoke playing time;

(d) reproducing playing time data for the requested karaoke songs from a karaoke data recording medium, the playing data including standard playing data and short playing data;

(e) calculating total playing time of the requested karaoke songs on the basis of the standard playing data of the requested karaoke songs;

(f) comparing the remaining playing time with the total playing time to determine whether all of the requested karaoke songs can be played within the remaining playing time or not;

(g) if the remaining playing time is shorter than the total playing time, then calculating the total playing time in such a manner that playing time of one of the requested karaoke songs is calculated on the basis of the short playing time data and playing time of other requested karaoke songs is calculated on the basis of the standard playing time data;

(h) comparing the remaining playing time with the total playing time newly calculated to determine whether all of the requested karaoke songs can be played within the remaining playing time or not;

(i) if the remaining playing time is shorter than the total playing time newly calculated, then increasing number of karaoke songs for which playing time is calculated on the basis of the short playing time data by one;

(j) repeating the steps (h) through (i) until the remaining playing time becomes larger than the total playing time newly calculated; and (k) displaying a notice related to the result of the determination to notify it to the user.

9. A method according to claim 8, wherein, if the remaining time does not becomes larger in the step (j) when the playing time of all of the requested songs are calculated on the basis of the short playing time data, then the step (k) displays a notice indicating that it is impossible to play all requested songs even by the short playing mode.

* * * * *